United States Patent
Larson et al.

(10) Patent No.: US 11,183,175 B2
(45) Date of Patent: Nov. 23, 2021

(54) SYSTEMS AND METHODS IMPLEMENTING DATA QUERY LANGUAGE AND UTTERANCE CORPUS IMPLEMENTS FOR HANDLING SLOT-FILLING AND DIALOGUE INTENT CLASSIFICATION DATA IN A MACHINE LEARNING TASK-ORIENTED DIALOGUE SYSTEM

(71) Applicant: Clinc, Inc., Ann Arbor, MI (US)

(72) Inventors: Stefan Larson, Ann Arbor, MI (US); Kevin Leach, Ann Arbor, MI (US); Michael A. Laurenzano, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 17/178,052

(22) Filed: Feb. 17, 2021

(65) Prior Publication Data
US 2021/0264902 A1    Aug. 26, 2021

Related U.S. Application Data

(60) Provisional application No. 62/978,942, filed on Feb. 20, 2020, provisional application No. 62/987,488, (Continued)

(51) Int. Cl.
*G10L 15/16* (2006.01)
*G10L 15/22* (2006.01)
(Continued)

(52) U.S. Cl.
CPC ............ *G10L 15/16* (2013.01); *G10L 15/063* (2013.01); *G10L 15/1822* (2013.01); *G10L 15/22* (2013.01); *G10L 2015/223* (2013.01)

(58) Field of Classification Search
CPC ... G10L 15/1822; G10L 15/16; G10L 15/063; G10L 15/22; G10L 2015/223
See application file for complete search history.

(56) References Cited

U.S. PATENT DOCUMENTS

| | | | |
|---|---|---|---|
| 6,349,276 B1 * | 2/2002 | McCarley | G06F 40/58 704/8 |
| 2005/0108001 A1 * | 5/2005 | Aarskog | G06F 40/253 704/10 |

(Continued)

*Primary Examiner* — Michael Colucci
(74) *Attorney, Agent, or Firm* — Padowithz Alce; Chandler Scheitlin; Alce

(57) ABSTRACT

A system and method of implementing an intuitive search interface for tactically searching one or more annotated utterance corpora in a machine learning-based dialogue system includes identifying an utterance corpus query for searching one or more annotated utterance corpora of a machine learning-based dialogue system; interpreting the utterance corpus query by translating the utterance corpus query into one or more search expressions recognizable to an utterance sample retrieval program searchably interfacing with the one or more annotated utterance corpora of the machine learning-based dialogue system; retrieving one or more annotated utterance samples from the one or more annotated utterance corpora based on the interpretation of the utterance corpus query; and returning the one or more annotated utterance samples to an intuitive utterance corpus search interface.

18 Claims, 3 Drawing Sheets

Related U.S. Application Data filed on Mar. 10, 2020, provisional application No. 63/150,339, filed on Feb. 17, 2021.

(51) Int. Cl.
*G10L 15/06* (2013.01)
*G10L 15/18* (2013.01)

(56) References Cited

U.S. PATENT DOCUMENTS

| | | | |
|---|---|---|---|
| 2011/0055256 A1* | 3/2011 | Phillips | G10L 15/30 707/769 |
| 2012/0036130 A1* | 2/2012 | Light | G06F 40/295 707/736 |
| 2012/0290293 A1* | 11/2012 | Hakkani-Tur | G06F 16/951 704/9 |
| 2016/0267078 A1* | 9/2016 | Morehead | G06F 40/216 |
| 2017/0293676 A1* | 10/2017 | Lowe | G06F 16/93 |
| 2019/0348041 A1* | 11/2019 | Cella | G06F 40/284 |
| 2019/0385595 A1* | 12/2019 | Wabgaonkar | G06F 40/35 |
| 2020/0312299 A1* | 10/2020 | Nama | G06F 16/3329 |

\* cited by examiner

```
┌─────────────────────────────────────────┐
│  Defining or Reading in Search Query Data S210  │
└─────────────────────────────────────────┘

┌─────────────────────────────────────────┐
│      Decomposing a Search Query S220    │
└─────────────────────────────────────────┘

┌─────────────────────────────────────────┐
│      Implementing a Corpus API S230     │
└─────────────────────────────────────────┘

┌ ─ ─ ─ ─ ─ ─ ─ ─ ─ ─ ─ ─ ─ ─ ─ ─ ─ ─ ─ ─ ┐
    Implementing a Data Transformation S240
└ ─ ─ ─ ─ ─ ─ ─ ─ ─ ─ ─ ─ ─ ─ ─ ─ ─ ─ ─ ─ ┘
```

FIGURE 2

SYSTEMS AND METHODS IMPLEMENTING DATA QUERY LANGUAGE AND UTTERANCE CORPUS IMPLEMENTS FOR HANDLING SLOT-FILLING AND DIALOGUE INTENT CLASSIFICATION DATA IN A MACHINE LEARNING TASK-ORIENTED DIALOGUE SYSTEM

CROSS-REFERENCE TO RELATED APPLICATIONS

This application claims the benefit of U.S. Provisional Application No. 62/978,942, filed 20 Feb. 2020, and U.S. Provisional Application No. 62/987,488, filed 10 Mar. 2020, 63/150,339, filed 17 Feb. 2021, which are incorporated in their entireties by this reference.

GOVERNMENT RIGHTS

The subject matter of the invention may be subject to U.S. Government Rights under National Science Foundation grants: NSF SBIR Phase 1 Grant—1622049 and NSF SBIR Phase 2 Grant—1738441.

TECHNICAL FIELD

The inventions herein relate generally to the machine learning and artificially intelligent dialogue systems fields, and more specifically to new and useful systems and methods for intelligently implementing machine learning models of a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in training the underlying machine learning models performing classification and predictive functions of the artificially intelligent conversation systems.

Therefore, there is a need in the machine learning field for systems and methods that enable rapid and efficient training of machine learning models and for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

BRIEF SUMMARY OF THE INVENTION(S)

In one or more embodiments, a method of implementing an intuitive search interface for tactically searching one or more annotated utterance corpora in a machine learning-based dialogue system, includes: identifying an utterance corpus query for searching one or more annotated utterance corpora of a machine learning-based dialogue system; interpreting the utterance corpus query by translating the utterance corpus query into one or more search expressions recognizable to an utterance sample retrieval program searchably interfacing with the one or more annotated utterance corpora of the machine learning-based dialogue system; retrieving one or more annotated utterance samples from the one or more annotated utterance corpora based on the interpretation of the utterance corpus query; and returning the one or more annotated utterance samples to an intuitive utterance corpus search interface.

In one or more embodiments, a syntax of the utterance corpus query is derived from an annotation syntax of a corresponding annotated utterance corpus of the machine learning-based dialogue system.

In one or more embodiments, the one or more annotated utterance corpora includes: a slot-filling corpus comprising a plurality of distinct annotated utterance samples, wherein each of the plurality of distinct annotated utterance samples includes a string of text defining an utterance having each slot-filling value annotated with a slot-filling label of a machine learning model.

In one or more embodiments, the one or more annotated utterance corpora includes: a dialogue intent corpus comprising a plurality of distinct annotated utterance samples, wherein each of the plurality of distinct annotated utterance samples includes a string of text defining an utterance having one or more dialogue intent classification labels annotated along a same line of the string of text.

In one or more embodiments, the one or more annotated utterance corpora includes: a slot-filling and dialogue intent corpus comprising a plurality of distinct annotated utterance samples, wherein each of the plurality of distinct annotated utterance samples of the slot-filling corpus and the dialogue intent corpus includes a string of text defining an utterance having: (a) each slot-filling value annotated with a slot-filling label of a machine learning model; and (b) one or more dialogue intent classification labels annotated along a same line of the string of text.

In one or more embodiments, each of the one or more annotated utterance corpora of the machine learning-based dialogue system includes a plurality of annotated utterance samples configured according to one or more prescribed annotation search syntax, wherein the one or more prescribed annotation search syntax include: (i) a slot-filling search syntax that arranges a machine learning-based slot-filling label in line with and juxtaposed to a target slot value, or (ii) dialogue intent search syntax that arranges a machine learning-based dialogue intent classification label in line with a string of utterance text of the one or more annotated utterance corpora.

In one or more embodiments, translating the utterance corpus query into one or more search expressions recognizable to the utterance sample retrieval program searchably interfacing with the one or more annotated utterance corpora of the machine learning-based dialogue system further includes formatting the utterance corpus query into recognizable annotated search syntax components based on derived requirements of the utterance sample retrieval program.

In one or more embodiments, translating the utterance corpus query into one or more search expressions recognizable to the utterance sample retrieval program searchably interfacing with the one or more annotated utterance corpora of the machine learning-based dialogue system further includes decomposing the utterance corpus query into recognizable annotated search syntax components based on derived requirements of the utterance sample retrieval program.

In one or more embodiments, identifying the utterance corpus query further includes: at least one of reading in the utterance corpus query into the intuitive utterance corpus search interface or defining the utterance corpus query within the intuitive utterance corpus search interface.

In one or more embodiments, retrieving the one or more annotated utterance samples from the one or more annotated utterance corpora further includes: implementing an inverted index retrieval process for performing a search of the one or more annotated utterance corpora based on the utterance corpus query.

In one or more embodiments, retrieving the one or more annotated utterance samples from the one or more annotated utterance corpora further includes: implementing an abstract syntax tree process for performing a search of the one or more annotated utterance corpora based on the utterance corpus query.

In one or more embodiments, the one or more annotated utterance corpora further includes: a plurality of annotated utterance samples, wherein each of the plurality of annotated utterance samples is structured to include entirely within a single line item: (i) a distinct utterance sample comprising a string of text defining an utterance, (ii) the dialogue intent of the distinct utterance sample, and (iii) one or more distinct character annotations interweaved within the string of text of the distinct utterance sample according to one or more prescribed annotated utterance corpora syntax.

In one or more embodiments, the method includes creating one or more new annotated utterance samples distinct from the one or more retrieved annotated utterance samples by applying a data transformation to the returned one or more annotated utterance samples.

In one or more embodiments, the method includes implementing an intelligent corpus application programming interface (API) operably interfacing with both the intuitive utterance corpus search interface and the one or more annotated utterance corpora, wherein: the intelligent corpus API receives the utterance corpus query, performs a search of the one or more annotated utterance corpora based on the utterance corpus query and implements the return of the one or more annotated utterance samples as results of the search to the intuitive utterance corpus search interface.

In one or more embodiments, the one or more search expressions define a pair of bounding characters arranged around [1] one or more target utterance tokens or a search-specific character and [2] an associated target slot-filling label.

In one or more embodiments, a method of implementing an intuitive search interface for tactically searching one or more annotated training corpora in a machine learning-based dialogue system, includes identifying a training corpus query for searching one or more annotated training corpora of a machine learning-based dialogue system; interpreting the training corpus query by translating the training corpus query into one or more search expressions recognizable to a training sample retrieval program searchably interfacing with the one or more annotated training corpora of the machine learning-based dialogue system; retrieving one or more annotated training samples from the one or more annotated training corpora based on the interpretation of the training corpus query; and returning the one or more annotated training samples to an intuitive training corpus search interface.

In one or more embodiments, a syntax of the training corpus query is derived from an annotation syntax of a corresponding annotated training corpus of the machine learning-based dialogue system.

In one or more embodiments, interpreting the training corpus query into one or more search expressions further includes: an annotated similarity search expression configured to return one or more training samples associated with one or more predetermined tokens.

In one or more embodiments, the one or more annotated training corpora further includes: a plurality of annotated training samples, wherein each of the plurality of annotated training samples are structured to include entirely within a single line item: (i) a distinct training sample comprising a string of text, (ii) the dialogue intent of the distinct training sample, and (iii) one or more distinct character annotations interweaved within the string of text of the distinct training sample according to one or more prescribed annotated training corpora syntax.

In one or more embodiments, identifying the training corpus query further includes: at least one of reading in the training corpus query into the intuitive training corpus search interface or defining the training corpus query within the intuitive training corpus search interface.

BRIEF DESCRIPTION OF THE FIGURES

FIG. 2 illustrates an example method in accordance with one or more embodiments of the present application.

DESCRIPTION OF THE PREFERRED EMBODIMENTS

Figure 1:
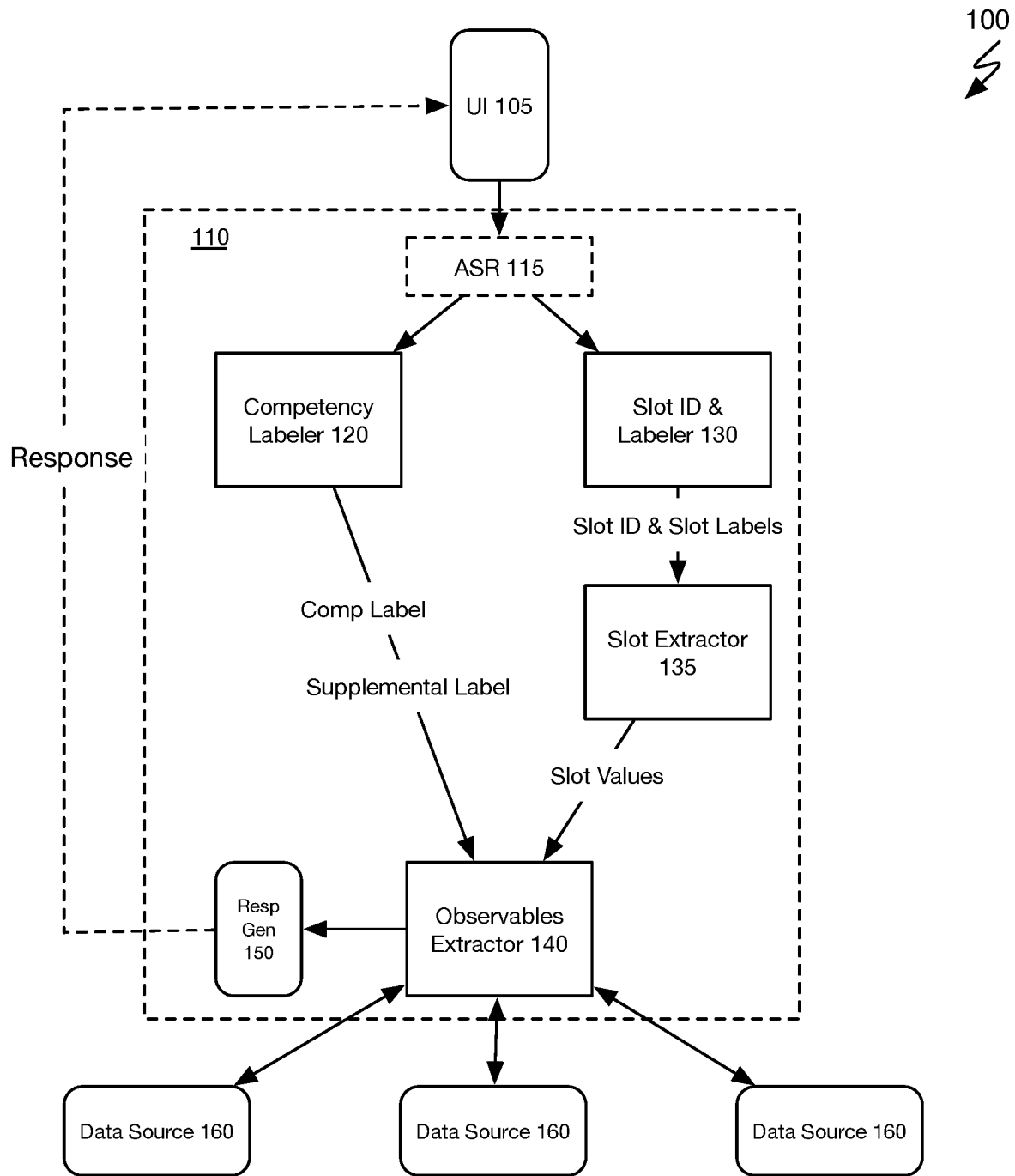
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from a user in which there are no predetermined rules designed around narrowly defined intents. This inflexible structure cannot reasonably and efficiently address the many variances in the manners in which the user may pose a query or command to the virtual assistant.

The embodiments of the present application, however, provide an artificially intelligent machine learning-based dialogue service and/or system with natural language processing capabilities that function to process and comprehend structured and/or unstructured natural language input from a user or input from any other suitable source and correspondingly provide highly conversant responses to dialogue inputs to the system. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, systems and methods are provided that enable an intelligent curation of training data for machine learning models that enable a rapid and efficient training of machine learning models employed in a machine learning-based dialogue system.

Data Query Language Overview

Typical machine learning approaches to developing task-oriented dialog systems require the collection and management of large amounts of training and/or utterance data, especially for the tasks of intent classification and slot-filling. Managing this data can be cumbersome without dedicated tools to help the dialog system designer understand the nature of the data. In one or more embodiments of the present application, systems and methods for querying (or searching) slot-filling and intent classification corpora are described. In some embodiments, the method includes a lightweight and readable data and file format for intent classification and slot-filling corpora of training and/or utterance samples, and a query language for searching intent classification and slot-filling corpora of training and/or utterance samples. In such embodiments, the method can be used to uncover intelligent insights on natural language understanding (NLU) datasets and perform transformations that enable one or more optimal deployments of the corpora of training samples.

1. System for a Machine Learning-Based Dialogue System

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140. Additionally, the system 100 may include an anomaly detection sub-system 170 that may function to receive training data samples as input and identify anomalous instances within the training data samples.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. No. 15/797,414 and U.S. patent application Ser. No. 15/821,010, which are both incorporated herein in their entireties by this reference. Specifically, the system 100 functions to ingest user input in the form of text or speech into a user interface 160. At natural language processing components of the system 100 that may include, at least, the competency classification engine 120, the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communicating with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform no. Thus, the AI virtual assistant platform no may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform no. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowd-sourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the competency classification engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

Figure 1A:
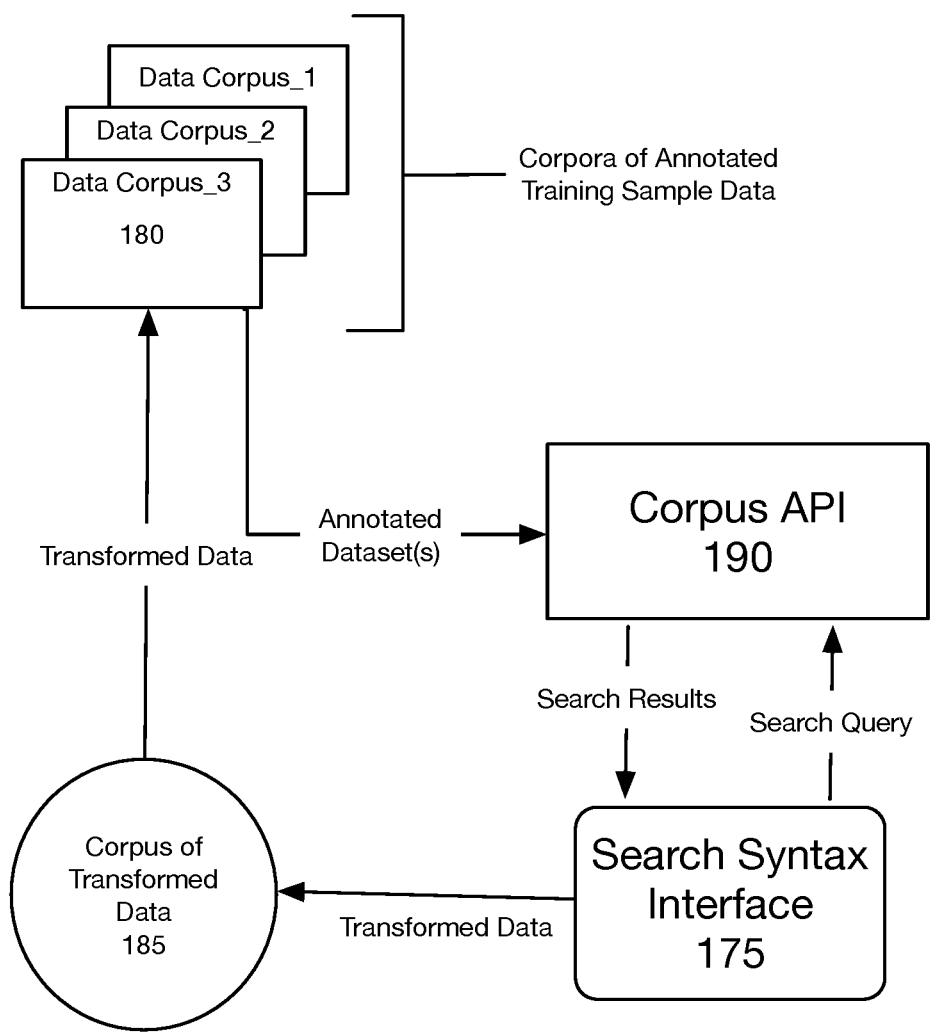
FIG. 1A illustrates a schematic representation of a sub-system of system 100 in accordance with one or more embodiments of the present application.

As shown in FIG. 1A, a subsystem 170 for implementing intelligent API searches and transformations of data within a machine learning-based dialogue system that includes a search syntax interface 175, a plurality of distinct data corpus defining a corpora of annotated training sample (and/or annotated utterance sample) data 180, a corpus of transformed data 185, and a corpus application programming interface (API) 190.

The search syntax interface 175 may function to accept (e.g., identify, read-in, and/or receive) a search query and return one or more search results (e.g., annotated utterance samples, annotated training samples, etc.) based on the search query (e.g., an utterance corpus query, a training corpus query, or the like). The plurality of distinct data corpus that defines a corpora of annotated training (or utterance) sample data 180 may function to electronically store a plurality of annotated training samples and/or annotated utterance samples. The corpus of transformed data 185 may function to create new annotated utterance (or training) samples distinct from retrieved annotated utterance (or training) samples by applying a data transformation to the returned annotated utterance (or training) samples of the search syntax interface 175. The corpus application programming interface (API) 190 may function to searchably interface with both the plurality of distinct data corpora 180 and the search syntax interface 175.

2. Method for Implementing Data Query Language

As shown in FIG. 2, a method 200 for implementing one or more intelligent search tools and data transformations within a machine learning-based dialogue system that includes data query language and training sample corpus tools for slot-filling data and intent classification data. The method 200, in some embodiments, includes composing, defining or reading in search query data S210, decomposing or interpreting the search query data into elementary or atomic search components S220, implementing a retrieval and a return of the target data via a corpus API S230. Optionally, the method 200 includes implementing one or more data transformations of the target data S240.

In one or more embodiments of the present application, the method 200 preferably enables an intelligent searching of a voluminous structured and/or unstructured corpus of training samples. The corpus of training samples preferably includes a plurality of training samples that may be modified with a data annotations format that may be designed to be lightweight and human-readable. The data annotations format, as applied to the corpus of training data, may function to enable annotation for dialogue or utterance intent and/or slot/entity data along a single line (e.g., entirely along a single line). Accordingly, the method 200 may function to implement a procedure to increase an ease and computational efficiency for processes involving searching through large and/or structurally complex (e.g., satisfying or exceeding a complexity threshold) datasets containing annotated or labeled data.

It shall be known that while, in some embodiments, the corpus of training samples may be referenced in a singular form, a target of the intelligent searching implementing the techniques of the methods and systems described herein may include a corpora of training sample data that may include a plurality of distinct corpus aggregated into a single body or data pool.

Accordingly, the method 200 may function to enable a user of a machine learning-based system or service to efficiently (e.g., in a limited number of steps or short amount of time) perform one or more intelligent (or tactical) searches of a training dataset and subsequent operations and/or transformations on data elements in batches or sets simultaneously. Specifically, the method 200 may function to implement a language for querying or searching through training data corpora and/or utterance data corpora that may be labeled or annotated in advance. Stated another way, a syntax of a search query (e.g., a corpus query, an utterance corpus query, a training corpus query, etc.) may be derived from an annotation syntax of one or more annotated corpora of a machine-learning based dialogue system. Additionally, or alternatively the format (or syntax) of a search query may be based on requirements derived from a sample retrieval program. The language may include a series, sets, or lists of elementary search functions that may be implemented singly or in combinations in one or more ways to facilitate complex or compound searches through a labeled and/or annotated data set of samples.

2.1 Search Query Data

S210, which includes collecting user input data in the form of a search query, may function to receive or identify user input data in any form that may be used as data for performing a search. The user input data may include, but is not limited to, speech or utterance input, textual input, gesture input, touch input, image input, and/or any suitable or type of input. In some embodiments, the user input data comprises one of (or a combination of) an utterance input and a textual input. Additionally, or alternatively, the user input data may include a query by the user or a command from the user.

In one or more embodiments, the user input data may be used for performing a search of a corpora of annotated training (or utterance) samples or the like. Preferably, in such embodiments, the user data input may be used to define or identify a subset of data or a class of data (e.g., target data) that the user desires to retrieve from a voluminous corpus of data for any purpose or to perform some batch modification or transformation to the data subset.

It shall be noted that in one or more embodiments, the corpora of annotated samples may be a slot-filling corpus that preferably includes a plurality of distinct annotated samples. Each of the plurality of distinct annotated samples may include a string of tokens (e.g., text) defining the sample and having each slot-filling value annotated with a slot-filling label of a machine learning model. For example, a distinct sample such as "please book me a spot for two at City Tavern" may correspond to at least two slot-filling labels and slot-filling values.

Therefore, the distinct sample may be stored and preferably represented along a single line in the slot-filling corpus as "please book me a spot for {PARTY_SIZE two} at {RESTAURANT City Tavern}→book_restaurant". That is each of the one or more annotated samples of a slot-filling corpus may include a plurality of annotated samples configured according to one or more prescribed annotation search syntax. This may include a slot-filling (search) syntax that arranges a machine learning-based slot filling label in line with and/or proximal (e.g., nearby, juxtaposed, adjacent, etc.) to a target slot value.

Stated another way, the slot-filling corpus may include a plurality of annotated samples, wherein each of the plurality of annotated utterance samples is structured to include entirely within a single line: a distinct sample comprising a string of text (or tokens), the dialogue intent of the sample, and one or more distinct character annotations interweaved within the string of text (or tokens) of the respective distinct sample according to one or more prescribed annotated corpora syntax.

Additionally, or alternatively, the corpora of annotated samples may be a dialogue intent corpus that preferably includes a plurality of distinct samples. Each of the plurality of distinct annotated samples may include a string of tokens having one or more dialogue intent classification labels annotated along a same line (e.g., same line) of the string of tokens (e.g., text). For example, a distinct sample such as "hi there what is my balance" may correspond to a greeting intent classification and an account intent classification and may be stored and preferably represented along the same line (or single line) in the dialogue intent corpus as "hi there what is my balance→greeting, balance". In other words, each of the one or more annotated samples of the dialogue intent corpus may include a plurality of annotated samples configured according to one or more prescribed annotation search syntax that may include a dialogue intent (search) syntax that arranges a machine-learning based dialogue intent classification label in-line (but preferably not interweaved) with a string of tokens or text of the distinct sample.

In a preferred implementation, the user input data for performing a search may be constructed according to one or more predefined formats of a corpus application programming interface (API) that operably interfaces and/or handles a corpus of training sample data. In a preferred embodiment, query language data (e.g., user input data) may function to mimic a file format used for a natural language understanding (NLU) corpora (e.g., the corpus of training sample data, etc.). Accordingly, special and/or unique characters used in annotating or otherwise modifying textual lines of training samples may be used as one or more components defining query language.

Additionally, or alternatively, the user input data or query language for implementing a search may be partially defined based on a search function format of one or more of a plurality of distinct search functions of the corpus API that enables operable search access to, communication with, and/or manipulation of the corpus of training samples. Accordingly, in one or more embodiments, the search function format(s) may be aligned with and/or informed by a set of routines or a set of protocols of the corpus API. It shall be noted that while in one or more embodiments, a corpus API is referenced herein, any suitable API may be implemented to interface with the corpus or corpora of training data samples to enable one or more searches and/or searching functions with the corpus or corpora of training data samples.

In one implementation, S210 may function to enable a construction of a search query (e.g., training corpus query, utterance corpus query, or the like) that is informed or otherwise defined by a single recognized search type or search function (or search protocol) of the corpus API. In particular, an implementation and/or functionality of the corpus API may be defined according to a library of distinct API functions or protocols that may be specifically designed to enable search of annotated datasets of a corpora of annotated training (or utterance) data samples.

In a second implementation, S210 may function to enable a construction of a search query (e.g., a training corpus query, a utterance corpus query, etc.) that is informed or otherwise defined by a multiple or a plurality of distinct recognized search types or functions of the corpus API. In such a second implementation, the search query includes a combination of the search types or search functions of a corpus API. That is, in such second implementation, two or more distinct search functions may be combined into a single search query that enables a more complex search relative to a search query comprising a single search function.

Additionally, or alternatively, S210 may include a pre-processing step that may function to validate or ensure that data or syntax of a given user input data for performing a search is formatted such that it can be consumed by the proceeding steps and/or by the corpus API.

In a preferred embodiment, S210 may function to implement Regular Expressions (i.e., regex, a sequence of characters that can define a search pattern) to facilitate complex searches including, but not limited to, search wildcards, groupings, quantification, and/or Boolean operations.

2.2 Query Component Decomposition

S220, which includes a decomposition and/or an interpretation of a search query into recognized and/or functional characters and/or terms, may function to decompose and/or interrupt a given search query and map the components of the search query to one or more logical expressions (e.g. simpler search functions of the API) and/or recognized query syntax of a corpus API or the like, and may additionally or alternatively function to build or recompose the original query into logical (or series of search expressions) expressions for search based on the mapping.

In one embodiment, S220 may initially identify a search query type and/or search function of a given search query. In such embodiments, S220 may function to map the given search query to a search function space that includes search archetypes or search protocols of the corpus API. Additionally, or alternatively, S220 may function to identify a search query type of a given search query based on a comparison or matching to a reference, such as a table or a listing, of recognized search archetypes or search functions of the corpus API. At least one technical benefit of identifying a search archetype of a given search query may be to inform a decomposition (or interpretation) technique or process to apply to the given search query.

2.2.1 Single Search Type/Function (Atomic) Decomposition

In a preferred implementation, S220 may function to atomically decompose search query data that may include and/or may be defined by a single recognized search type or search function of the corpus API of a machine learning-based dialogue service or system.

In one or more embodiments, S220 may function to atomically decompose a given search query (e.g., a training corpus query, an utterance corpus query, etc.) into distinct components that may include one or more of search syntax components and one or more target data components (e.g., search terms, search values, etc.).

Preferably, the recognized syntax components of the given search query may include syntax that enables one or more recognized search functions or processes by the corpus API. That is, the recognized syntax components may include one or more distinct characters that, when executed, by the corpus API in a search of a given corpus of data perform distinct modifications to the search parameters. Thus, the recognized (query) syntax components may be one or more characters or values that the corpus API comprehends as corresponding to a given search operation or API-defined search operation and the like.

Preferably, the one or more target data components may include search terms or search data elements describing target data that a user desires to retrieve from a corpus or corpora of data. Accordingly, a decomposition (or interpretation) of a given search query may function to inform one or more search functions or operations to be performed or executed by the corpus API or the like.

Additionally, or alternatively, in one or more embodiments, the decomposition, interpretation, or a composition of a given search query may be represented in an abstract syntax tree or the like. In such embodiments, the abstract syntax tree may be used as an input for guiding one or more searches by the corpus API of a given corpus of data. That is, the abstract syntax tree may be used to perform a search based on including a representation of the decomposed or elementary query components of the given search query.

Additionally, or alternatively, in other embodiments, any suitable data structure and/or parsing procedure may be used for component decomposition or component interpretation of a search query (e.g., a training corpus query, an utterance corpus query, or the like).

A non-exhaustive listing of examples of functional query atomic components is described in the following sections.

2.2.1.1 Searching for Slot Labels

In one embodiment, S220 may function to implement a search archetype comprising a slot label search function. In this embodiment, the slot label search function may function to identify and/or return subsets of data that contain and/or are annotated with one or more specific slot-filling labels (e.g., slot label "ACCOUNT"), and/or contain one or more tokens within one or more designated slots (e.g., token "savings" within slot-filling label "ACCOUNT", a search-specific character token "*" within slot label "ACCOUNT", etc.). Additionally, or alternatively, the slot label search function (or slot label search query) may define a pair of bounding characters (e.g., "{ }") arranged around an associated target slot-filling label (e.g., slot label "ACCOUNT") and/or one or more target utterance tokens or one or more search specific characters (i.e., {ACCOUNT "savings" }, {ACCOUNT *}, {ACCOUNT *}>1, etc.).

2.2.1.2 String Searches

In one embodiment, S220 may function to implement a search archetype comprising a string search function. In this embodiment, the string search function may function to identify and or return subsets of data or samples containing one or more strings (or sequences of tokens), within a training data corpus or training data corpora. For example, a string search for the token "make a transfer" may return all instances within a dataset in which that exact sequence of tokens is used.

2.2.1.3 Slot Number Searches

In one embodiment, S220 may function to implement a search archetype comprising a slot number search function. In this embodiment, the slot number search function may function to identify and/or return subset of data or samples containing a specified or designated number of slots. This search type may include searching for a certain number (e.g., one or more slots, two or more slots, three or more slots, etc.) of one or more designated slots, or searching for the number of total slots of any type.

2.2.1.4 Slot Sequence Searches

In one embodiment, S220 may function to implement a search archetype comprising a slot sequence search function. In this embodiment, the slot sequence search function may function to identify and or return subsets of data or samples that contain or are characterized by a specified pattern or ordering of slots (e.g., "SOURCE" followed by "AMOUNT" followed by "TARGET"). For example, a slot sequence search query configured to return utterance or training data samples with a characterized pattern or ordering of slots (e.g., from a checking account (i.e., source) to a savings account (i.e., destination) may be designated/formatted as "from {SRC checking} to {DST savings}".

2.2.1.5 Similarity Search

In one embodiment, S220 may function to implement a search archetype comprising a similarity search function. In this embodiment, the similarity search function may function to identify and/or return subsets of data or samples identified as similar to one or more tokens, strings, slot labels, intents, and/or any other factor or characteristic of one or more samples to include non-exact matches as defined by a similarity function. Such a similarity function may include a thesaurus or dictionary (e.g. "Transfer" and "Move"), character difference (e.g. mis-spellings such as "Dollars" and "Dollers"), or any other suitable similarity function.

In a non-limiting example, the similarity search function may enable support for word embedding or sentence embedding similarity searches. That is, in one or more embodiments, S220 may function to identify words (or tokens) and return words that may be similar in semantics or meaning, even if the word or token may be visually distinct. S220 may likewise function to implement the similarity search function to identify sentences within a corpus that may be semantically similar, even if a structure and/or tokens within the identified sentences are distinct from a source sentence (e.g., search sentence) of the similarity search.

2.2.1.6 Intent Search

In one embodiment, S220 may function to implement a search archetype comprising a slot sequence search function. In this embodiment, the slot sequence search function may function to identify and or return subsets of data or samples characterized by one or more specified dialogue intents, as defined by previously-identified intent labels in the dataset (e.g. search for samples containing a "Greeting" intent label). For example, a dialogue intent search query configured to return all utterance and/or training data samples with at least two intents (e.g., a "Greeting" intent label and a "Balance" intent label may be queried as "*"→greeting and balance.

2.2.2 Multiple Search Type/Function

Additionally, or alternatively, a given search query may include a combination of two or more search archetypes and/or atomic search query components. That is, two or more of the elementary search functions described herein may be implemented independently and may additionally or alternatively be implemented in combination with one another or other search or query functions.

In a preferred embodiment, multiple search types may function to be combined together using one or more of: Boolean or logical expressions, regular expressions, or any other suitable method for concatenating or altering search terms.

Accordingly, in one or more embodiments in which a given search query includes multiple distinct search functions and/or search archetypes, S220 may initially function to decompose the combination search query into the distinct search functions and/or search archetypes. Once decomposed into the distinct or individual search functions and/or search archetypes defining the combination search query, S220 may function to implement atomic query decomposition (as described above) to each of the individual search functions or archetypes. In some embodiments, S220 may function to atomically decompose the multiple distinct or individual search functions and/or search archetypes in parallel.

It shall be noted that while it may be preferable to first decompose a combination search query into its multiple distinct search functions and/or search archetypes, in some embodiments, an atomic query decomposition of a combination search query may be performed that decomposes the combination search query into search syntax components and target data components prior to executed a search with the corpus API.

2.3 Retrieval and Returning Results

S230, which includes retrieving one or more pieces of data from a corpus or corpora of data, may function to implement one or more data retrieval techniques based on features of a search query. That is, S230 may function to execute a search of one or more corpora of data via a corpus API based on a decomposition or interpretation of a given search query to return pieces of data or training samples from the one or more corpora of data. In a nonlimiting example, S230 may function to perform a search based on executing information from an abstract syntax tree.

In one implementation, S230 may function to implement an inverted index retrieval process for performing a search of a corpora of data (e.g., one or more annotated utterance corpora, one or more annotated training corpora, etc.). It shall be noted, however, that any suitable retrieval system or combination of retrieval systems or programs may be used, including a query language such as SQL or regular expression (e.g. full text) search.

In some embodiments, S230 may additionally include returning results of the search that includes a sequence, series, or list of pieces of data (e.g., training samples) via the corpus API in a variety of formats. Such formats may include, but are not limited to, an exhaustive list of the text of all results, a list of indices or hashes where the results are stored in a larger dataset, or a dataset containing only the returned results with its own corresponding indices.

S230 may optionally or additionally function to sort the results based on a variety of factors, which may include character length, number of slots, amount of some token within a slot label (e.g., the amount of a transfer in US dollars), or any suitable sorting criteria or criterion, using any suitable sorting mechanisms and/or sorting functions.

Additionally, or alternatively, S230 may function to execute a search of one or more corpora of data via a data sample retrieval program (e.g., an utterance sample retrieval program, a training sample retrieval program, a corpus API) based on a decomposition or interpretation of a given search query. This may return pieces of data or training (or utterance) samples from the one or more corpora of data (e.g., one or more annotated utterance corpora, one or more annotated training corpora, etc.) to an intuitive corpus search interface (e.g., a search syntax interface, an utterance corpus search interface, a training corpus search interface.

2.4 Data Transformations

Optionally, or additionally, S240, which includes implementing or performing select transformations of data, may function to take the one or more results of the search and perform one or more selected transformations, for example, relabeling a set of data from one slot label to another.

In one embodiment, S240 may function to create a new dataset with the transformed data, separate and/or distinct from the original data training corpus. Additionally, or alternatively, S240 may function to augment, modify, or replace elements or subsets of the original data training corpus with the data subject to the transformation. In further implementations, S240 may function to create new annotated training (or utterance) samples distinct from the retrieved annotated training (or utterance) samples by applying a data transformation to the returned annotated utterance samples.

It shall be noted that any suitable transformation of the resulting data from an intelligent search, using the one or more techniques described in the method 200, of a given corpus or corpora of data may be performed.

While in several of the embodiments described herein, the method 200 may function to identify outliers and/or intelligently construct training data corpus based on the identified outliers for training and/or improving models that preferably perform dialogue intent classification, it shall be noted, however, that the outlier identification techniques and training data corpus formation techniques that are described may be used to intelligently train and improve any suitable model that may perform any type or kind of inferential/prediction tasks and any type or kind of classification tasks including, but not limited to, slot value classification/inference, utterance intent classification, dialogue predictions, and/or the like.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method of implementing an intuitive search interface for tactically searching one or more annotated utterance corpora in a machine learning-based dialogue system, the method comprising:
   identifying an utterance corpus query for searching one or more annotated utterance corpora of a machine learning-based dialogue system, wherein each of the one or more annotated utterance corpora include a plurality of annotated utterance samples according to a prescribed annotation format;
   constructing one or more portions of the utterance corpus query into one or more search expressions based on the prescribed annotation format of the one or more annotated utterance corpora, wherein each of the one or more search expressions is recognizable to an utterance sample retrieval program that searchably interfaces with the one or more annotated utterance corpora of the machine learning-based dialogue system;
   retrieving a subset of annotated utterance samples from the plurality of annotated utterance samples based on satisfying the one or more search expressions associated with the utterance corpus query; and
   returning the subset of annotated utterance samples to an intuitive utterance corpus search interface based on the retrieval.

2. The method of claim 1, wherein
the one or more annotated utterance corpora includes:
   a slot-filling corpus comprising the plurality of annotated utterance samples, wherein each of the plurality of annotated utterance samples includes a string of text defining an utterance having each slot-filling value annotated with a slot-filling label of a machine learning model.

3. The method of claim 1, wherein
the one or more annotated utterance corpora includes:
   a dialogue intent corpus comprising the plurality of annotated utterance samples, wherein each of the plurality of annotated utterance samples includes a string of text defining an utterance having one or more dialogue intent classification labels annotated along a same line of the string of text.

4. The method of claim 1, wherein
the one or more annotated utterance corpora includes:
- a slot-filling and dialogue intent corpus comprising the plurality of annotated utterance samples, wherein each of the plurality of annotated utterance samples of the slot-filling corpus and the dialogue intent corpus includes a string of text defining an utterance having:
  - (a) each slot-filling value annotated with a slot-filling label of a machine learning model; and
  - (b) one or more dialogue intent classification labels annotated along a same line of the string of text.

5. The method of claim 1, wherein
the prescribed annotation format of the one or more annotated utterance corpora include:
- (i) a slot-filling format that arranges a machine learning-based slot-filling label in line with and juxtaposed to a target slot value,
or
- (ii) a dialogue intent format that arranges a machine learning-based dialogue intent classification label in line with a string of utterance text of the one or more annotated utterance corpora.

6. The method of claim 5, wherein
constructing the utterance corpus query into one or more search expressions recognizable to the utterance sample retrieval program that searchably interfaces with the one or more annotated utterance corpora of the machine learning-based dialogue system further includes:
- formatting the utterance corpus query into recognizable annotated search syntax components based on derived requirements of the utterance sample retrieval program.

7. The method of claim 5, wherein
constructing the utterance corpus query into one or more search expressions recognizable to the utterance sample retrieval program that searchably interfaces with the one or more annotated utterance corpora of the machine learning-based dialogue system further includes:
- decomposing the utterance corpus query into recognizable annotated search syntax components based on derived requirements of the utterance sample retrieval program.

8. The method of claim 1, wherein
identifying the utterance corpus query further includes:
- at least one of reading in the utterance corpus query into the intuitive utterance corpus search interface or defining the utterance corpus query within the intuitive utterance corpus search interface.

9. The method of claim 1, wherein
retrieving the one or more annotated utterance samples from the one or more annotated utterance corpora further includes:
- implementing an inverted index retrieval process for performing a search of the one or more annotated utterance corpora based on the utterance corpus query.

10. The method of claim 1, wherein
retrieving the one or more annotated utterance samples from the one or more annotated utterance corpora further includes:
- implementing an abstract syntax tree process for performing a search of the one or more annotated utterance corpora based on the utterance corpus query.

11. The method of claim 1, wherein
each of the plurality of annotated utterance samples is structured to include entirely within a single line:
- (i) a distinct utterance sample comprising a string of text defining an utterance,
- (ii) the dialogue intent of the distinct utterance sample, and
- (iii) one or more distinct character annotations interweaved within the string of text of the distinct utterance sample according to the prescribed annotated format.

12. The method of claim 1, further comprising
creating one or more new annotated utterance samples distinct from the one or more retrieved annotated utterance samples by applying a data transformation to the returned one or more annotated utterance samples.

13. The method of claim 1, further comprising
implementing an intelligent corpus application programming interface (API) operably interfacing with both the intuitive utterance corpus search interface and the one or more annotated utterance corpora, wherein:
- the intelligent corpus API receives the utterance corpus query, performs a search of the one or more annotated utterance corpora based on the utterance corpus query and implements the return of the one or more annotated utterance samples as results of the search to the intuitive utterance corpus search interface.

14. The method of claim 1, wherein
the one or more search expressions define a pair of bounding characters arranged around [1] one or more target utterance tokens or a search-specific character and [2] an associated target slot-filling label.

15. A method of implementing an intuitive search interface for tactically searching one or more annotated training corpora in a machine learning-based dialogue system, the method comprising:
- identifying a training corpus query for searching one or more annotated training corpora of a machine learning-based dialogue system, wherein each of the one or more annotated training corpora include a plurality of annotated training samples according to a prescribed annotation format;
- constructing one or more portions of the training corpus query into one or more search expressions based on the prescribed annotation format of the one or more annotated training corpora, wherein each of the one or more search expressions is recognizable to a training sample retrieval program that searchably interfaces with the one or more annotated training corpora of the machine learning-based dialogue system;
- retrieving a subset of annotated training samples from the plurality of annotated training samples based on satisfying the one or more search expressions associated with the training corpus query; and
- returning the subset of annotated training samples to an intuitive training corpus search interface based on the retrieval.

16. The method of claim 15, wherein
constructing the training corpus query into one or more search expressions further includes:
- an annotated similarity search expression configured to return one or more training samples associated with one or more predetermined tokens.

17. The method of claim 15, wherein
each of the plurality of annotated training samples are structured to include entirely within a single line:
- (i) a distinct training sample comprising a string of text,
- (ii) the dialogue intent of the distinct training sample, and (iii) one or more distinct character annotations interweaved within the string of text of the distinct training sample according to the prescribed annotated format.

18. The method of claim 15, wherein identifying the training corpus query further includes:
at least one of reading in the training corpus query into the intuitive training corpus search interface or defining the training corpus query within the intuitive training corpus search interface.

* * * * *